United States Patent

Hutcheson et al.

[11] 3,995,155
[45] Nov. 30, 1976

[54] INTEGRATED OPTICAL DATA BUS COUPLER

[75] Inventors: Lynn D. Hutcheson; Nicholas Bottka, both of Ridgecrest, Calif.

[73] Assignee: The United States of America as represented by the Secretary of the Navy, Washington, D.C.

[22] Filed: June 6, 1975

[21] Appl. No.: 584,321

[52] U.S. Cl. .......................... 250/227; 350/96 WG; 350/96 C
[51] Int. Cl.² ........................ G02B 5/14; H01J 5/16
[58] Field of Search ........ 350/96 C, 96 WG, 160 R, 350/161; 250/227, 211; 332/7.51

[56] References Cited
UNITED STATES PATENTS

| | | | |
|---|---|---|---|
| 3,229,104 | 1/1966 | Rutz | 250/227 |
| 3,295,911 | 1/1967 | Ashkin et al. | 350/96 WG |
| 3,724,926 | 4/1973 | Lee | 350/160 R |
| 3,748,597 | 7/1973 | Reinhart | 332/7.51 |
| 3,871,743 | 3/1975 | Fulenwider | 350/96 C |

Primary Examiner—Davis L. Willis
Assistant Examiner—David K. Moore
Attorney, Agent, or Firm—R. S. Sciascia; Roy Miller

[57] ABSTRACT

A data bus coupler having a fiber optic bundle input, a separate optical modulator or detector (described in a concurrent disclosure by the same inventors) attached to each fiber of the bundle for adding information to, extracting information from, or detecting the information conducted by the fiber, and an output wherein the fibers are rejoined into a fiber optic bundle. The optical modulator/detectors are double heterojunction semiconductors that are switched "on" by reverse biasing and with large voltages they may act as photoavalanche diodes when detecting incident radiation.

6 Claims, 1 Drawing Figure

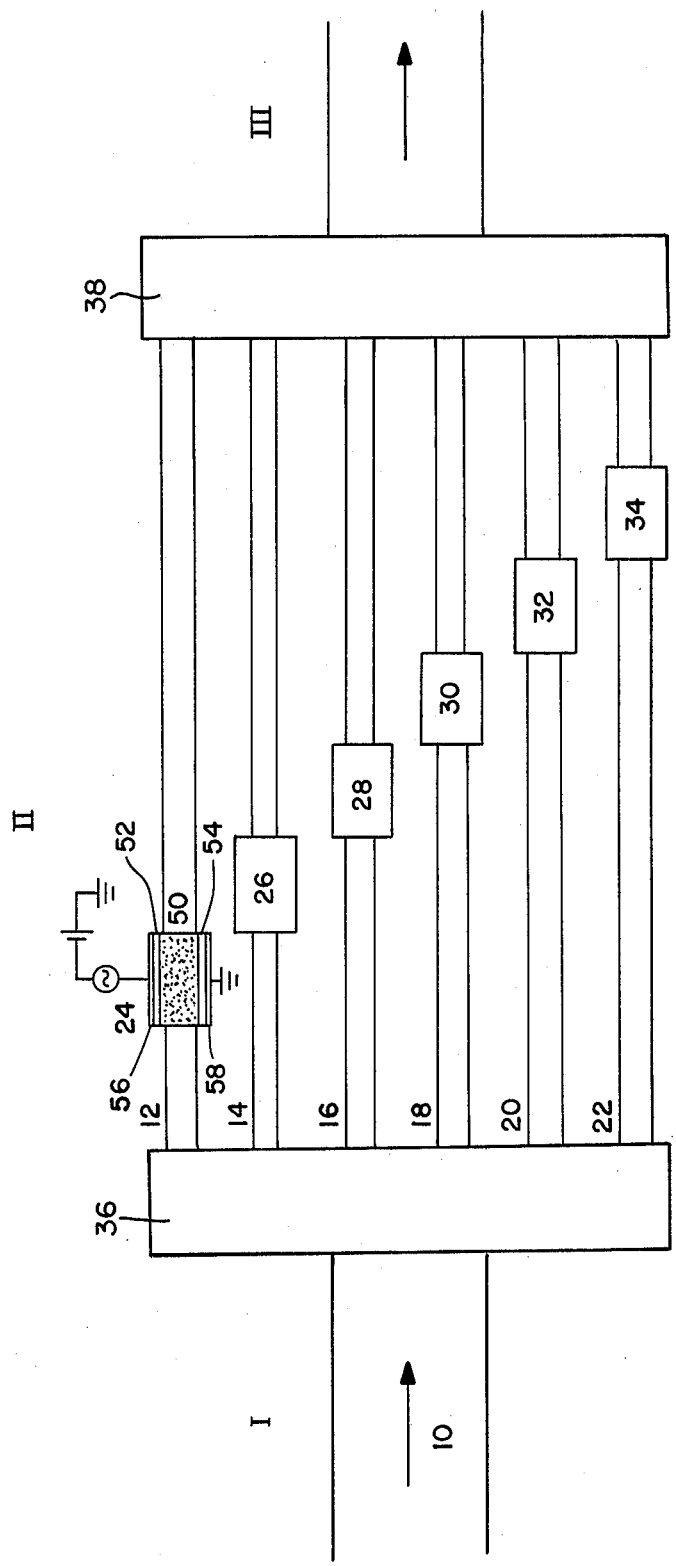

INTEGRATED OPTICAL DATA BUS COUPLER

RELATED APPLICATIONS

The present invention is closely related to the invention of U.S. application Ser. No. 565,486, filed Apr. 7, 1975 entitled "Integrated Absorptive Light Modulator/Detector," by the present inventors, which disclosure is incorporated herein by reference.

BACKGROUND OF THE INVENTION

In the field of electro-optics, solid state devices are being developed to improve existing apparatus and make possible functional achievements never before attainable. That is especially true in the field of integrated optics wherein the present invention resides.

Some materials are transmissive to some wavelengths but are absorptive of shorter wavelengths. The shift of the optical absorption edge to lower energies (longer wavelengths) under the influence of an electric field has been predicted for insulators and semiconductors by Keldysh and Franz in 1958. Their predictions along with the experimental observations of Williams, Moss, and Boer et al, and Vavilov and Britsyn opened up a new branch of physics which has since grown and ramified. The potential use the Franz-Keldysh effect as a mechanism for intensity light modulation has also been recognized by the early workers in the field of electro-optics. But, the nonlinearity of the effect coupled with difficulties in the materials limited the use of these devices. Recent development in material technology in the field of integrated optics has spawned new techniques and attempts at devising new electroabsorption light modulators, switches and detectors.

The invention of the above-identified, related U.S. Pat. application is directed to the Franz-Keldysh mechanism in materials as they apply to electroabsorption, light modulation and detection. The geometry of the embodiment described consists of a liquid phase epitaxy GaAs double-heterojunction structure. Depending on the application, light is either coupled parallel to the junction or transmitted perpendicular to it. The former would be used as a component in integrated optics whereas the latter would find other applications. In the latter the GaAs substrate and top electrode could be removed by etching. In both cases, a reverse bias to the device will generate a high electric field within the GaAs material and induce a shift of its optical absorpton edge to lower energies. Light having photon energy slightly less than the level of the absorption edge will be attenuated in the GaAs region, and electron hole pairs will be created and swept out into the electrical contact in the presence of a high electric field. The latter phenomenon is photodetection and can be used as a means of detecting the light. Thus, a train of light pulses can be either transmitted through the device by applying no electric field to the active region or attenuated by applying a reverse bias. At the same time the light's presence can be detected through photodetection when a large field is applied, i.e., electroabsorption.

The present invention utilizes the invention of the above-identified related application in a data bus coupler wherein multiple channels of information are conveyed by a single conveyence means such as a fiber optics bundle, and the channels are separated into a plurality of separate channels each of which includes a modulator or detector device. Each modulator or detector can then independently process or detect selected portions of the information determined by the electric field applied. After modulation the channels may be recombined into a bundle for further conveyance and detected at a further point down the fiber. The modulators are in parallel, but the detectors may act in series or in parallel as desired.

BRIEF DESCRIPTION OF THE DRAWING

The FIGURE is a plan view of the preferred embodiment of the present invention.

DESCRIPTION OF THE PREFERRED EMBODIMENT

The preferred embodiment of the present invention is shown in the drawing and includes section I comprising means for conveying a plurality of channels of information; section II comprising means for separating the information into individual channels, separately modulating or detecting information contained therein in response to an applied electric field wherein each modulator or detector may be subjected to a separate electric field that is unique, and means for recombining the channels of information; and section III comprising means for conveying a plurality of channels of information in a bundle as in section I.

Each modulator or detector of section II is a double-heterojunction structure having an active region that consists of a high resistivity binary compound or ternary alloy which has a low concentration of carriers. An active region may be bounded by thin layers and of materials having higher dielectric constants than that of the active region. These layers provide boundaries to incident radiation received laterally or longitudinally by the device such that the active region is a waveguide to the incident radiation. Additional thicker layers from the top and bottom layers of the sandwich provide structural support for the active region and boundary layers. If composed of the materials in the example given below or by other such materials properly selected, the detector's structure will be transparent to the radiation of interest. As a result, if desired, incident radiation may be received transverse of the double-heterojunction structure. Whether received transverse or parallel to the active region, the techniques of the present invention would be the same although parallel reception would subject the radiation to the active region for a greater length of time due to its greater length versus its depth.

The double-heterojunction structure is back biased by a DC voltage to establish an electric field in the active region. The absorption edge of the active region is thereby shifted toward longer wavelengths. In the present invention a modulation signal source for shifting the absorption edge back and forth in a preselected pattern, and detection circuitry for receiving and processing a detected pulse from the semiconductor structure are included.

Each modulator or detector operates as follows: light of a wavelength just below the absorption edge of active region 10 is coupled to the junction cavity. By applying a reverse bias to the junction a high electric field is created in the depletion, or active, region which shifts the absorption edge of the cavity material toward longer wavelengths. Thus, the active region now attenuates or blocks the transmittance of incident light. In addition, if the back bias is large, the junction will act as a photo avalanche diode to the incident radiation. So, when the back bias is increased, as by a reinforcing modulation swing, incident radiation will be absorbed and detected. Thus, coupled incident radiation can be modulation or absorbed in traversing the junction, and another moment later, the structure can act as a detector in registering the event.

The modulator/detector(s) of the present invention may be made of Gallium Arsenide and composed of the following layers as graphically depicted by device 24. The structure of device 24 is exemplary, and is not to scale. Active region 50 may be low dopant (approximately $10^{16/cm}$) GaAs. Layer 52 may be P type $Ga_{1-x}Al_xAs$. Layer 54 may be N type $Ga_{1-x}Al_xAs$. Layer 56 may be P type GaAs. And, layer 58 may be N type GaAs.

The presently invented data bus coupler employs a plurality of modulator/detectors of the type described above and in the above-identified related patent application. It is contemplated that each channel of the coupler can be treated wholly independently of the other channels and that each modulator/detector can be independently controlled by a separate electric field. If desired, however, identical fields may be applied to more than one modulator or detector and more than one modulator or detector may be used per channel. The information channels may be separate in sections I and III so that the information in one is not combined with the information in others, or they may be intentionally combined depending on the desired application. If they are combined the information in each channel of section II will be identical before it is exposed to the modulator/detector in that channel. In such an application the absorption edge of the modulator/detector may be adjusted and, perhaps, varied to detect a particular wavelength, wherein, the modulators/detectors would likewise be adjusted to detect particular wavelengths such that an output provided by the first detector would be indicative of the presence of a particular wavelength and an output by the second detector would be indicative of a different wavelength, and so on.

It is contemplated in the present invention that the modulator/detectors will be oriented so that light conveyed by the respective channels will be injected parallel to the active regions of the modulator/detector.

The preferred embodiment of the present invention operates as follows: fiber optic bundle 10 is separated by separating means 36 into a plurality of channels 12-22 wherein each channel contains one or more fibers connected to one or more of the fibers in fiber optic bundle 10. The information received by each channel from the bundle is conveyed to its modulator or detector 24-34, respectively. The information in each channel may be different from the information appearing in each of the other channels depending on the information conveyed by the fibers of bundle 10 to which it is connected.

If the device is operated as a detector and the information in channel 16, for example, need not be detected, no reverse bias will be applied to detector 28. However, if the information is needed, a large reverse bias is applied and the information will be detected, if present. If the anticipated information is in the channel at that time, detection will result from the photo avalanche effect in the semiconductor due to the large reverse bias. If the anticipated information is not present, the semiconductor will not be placed in photo avalanche condition. Once detected the information can be extracted to be utilized by any means desired.

The devices may be arranged in parallel, as shown, or in series when operated as detectors.

If it is desirable to inject new information into the data bus system, the modulator/detector can be employed to modulate a light emitting diode (LED) or a laser diode. The modulated output of either will then include the information to be injected, which then can be injected by inserting the light into the appropriate channel. This can be accomplished by applying an appropriate modulating signal, as shown at device 24, to shift the absorption edge of the device partially into the information conveyed, and alter it to thereby carry the modulation information.

Once the information in each channel has been processed, detected or merely transmitted it is recombined by recombining means 38 into a fiber optic bundle in section III. The channels are recombined in the same but reverse manner as they were separated. The resultant system provides means for detecting information in, and means for inserting information by modulation into, an optical data bus.

To those skilled in the art it will be obvious upon a study of this disclosure that the present invention permits a variety of modification in structure and arrangement and hence can be given embodiments other than particularly illustrated and described herein, without departing from the essential features of the invention within the scope of the claims annexed hereto.

What is claimed is:
1. Integrated optics data bus apparatus wherein optically conveyed information is channelized for selective processing and then recombined for optical conveyance, comprising:
   first and second optical means for conveying data;
   optical means for separating said data conveyed by said first means into a plurality of optical channels;
   semiconductor structure in each of said channels supportive of the Franz-Keldysh effect for selectively processing data transmitted by said channel; and
   optical means for recombining said channels into said second data conveying means;
   such that said apparatus is a data bus.
2. The apparatus of claim 1 wherein said first and second means for conveying data are fiber optic bundles.
3. The apparatus of claim 2 wherein said optical separating and recombining means are individualized fiber optics of said fiber optic bundles.
4. The apparatus of claim 3 wherein at least one of said semiconductor structures is a double-heterojunction structure wherein the absorption edge of said structure is selectively shifted partially into said data transmitted by that channel such that said device modulates said data.
5. The apparatus of claim 3 wherein said apparatus additionally includes at least one double-heterojunction semiconductor structure in said second conveying means and the absorption edge of said structure is selectively shifted to absorb all of at least part of said data such that said structure is a detector.
6. The apparatus of claim 3 wherein at least one of said semiconductor structures is a double-heterojunction structure wherein the absorption edge of said structure is selectively shifted to absorb all of at least part of said data transmitted by that channel such that said structure is a detector.

* * * * *